United States Patent [19]

Shino

[11] Patent Number: 5,296,692
[45] Date of Patent: Mar. 22, 1994

[54] IC CARD ADAPTER FOR USE IN MEMORY CARD SLOT WITH OR WITHOUT SUPERIMPOSED MEMORY CARD

[75] Inventor: Katsuhide Shino, Soraku, Japan

[73] Assignee: Sharp Kabushiki Kaisha, Osaka, Japan

[21] Appl. No.: 746,179

[22] Filed: Aug. 15, 1991

Related U.S. Application Data

[63] Continuation of Ser. No. 425,102, Oct. 23, 1989, abandoned.

[30] Foreign Application Priority Data

| Oct. 24, 1988 | [JP] | Japan | 63-138469[U] |
| Oct. 28, 1988 | [JP] | Japan | 63-141704[U] |
| Oct. 28, 1988 | [JP] | Japan | 63-141705[U] |
| Oct. 28, 1988 | [JP] | Japan | 63-141706[U] |

[51] Int. Cl.⁵ .......................... G06K 7/00; H05K 5/00
[52] U.S. Cl. .................... 235/486; 235/492; 361/752
[58] Field of Search ............ 235/441, 487, 492, 486; 206/328-331, 387; 365/52; 361/392, 393, 395, 399, 417, 419, 420

[56] References Cited

U.S. PATENT DOCUMENTS

| 4,277,837 | 7/1981  | Stuckert     | 235/380    |
| 4,523,297 | 6/1985  | Ugon et al.  | 235/380    |
| 4,709,137 | 11/1987 | Yoshida      | 235/379    |
| 4,774,399 | 9/1988  | Fujita et al.| 235/441    |
| 4,840,570 | 6/1989  | Mann, Jr. et al. | 439/74 |
| 4,843,223 | 6/1989  | Shino        | 235/441    |
| 4,864,116 | 9/1989  | Banjo et al. | 235/441    |
| 4,870,604 | 9/1989  | Tatsuno      | 235/380    |
| 4,877,950 | 10/1989 | Halpern      | 235/380    |
| 4,916,662 | 4/1990  | Mizuta       | 235/380    |
| 4,960,983 | 10/1990 | Inoue        | 235/493    |
| 4,975,805 | 12/1990 | Schmutzler   | 361/399    |
| 5,043,562 | 8/1991  | Hautvast et al. | 235/441 X |

FOREIGN PATENT DOCUMENTS

| 0313882   | 5/1989 | European Pat. Off. | 235/475 |
| 60-066383 | 4/1985 | Japan              | 365/52  |
| 63-231690 | 9/1988 | Japan              | 235/487 |
| 1-21174   | 5/1990 | Japan              | 369/258 |

OTHER PUBLICATIONS

Martino, "Machine-Readable Personal Identification Module", IBM Technical Disclosure Bulletin, vol. 23, No. 2, Jul. 1980.

*Primary Examiner*—Davis L. Willis
*Assistant Examiner*—Edward Sikorski
*Attorney, Agent, or Firm*—Nixon & Vanderhye

[57] ABSTRACT

An adapter having female contacts (24) is inserted into a slot provided in an electronic apparatus. The adapter includes a memory card (20) permanently connected to the female contacts, and an opening for receiving an IC card (30). Alternatively, the adapter (80) may use a inductive coil (84) and a circuit unit (83) to interface with a non-contact IC card (50). The latter adapter may include a keyboard (85), display (86), and power supply (87).

11 Claims, 7 Drawing Sheets

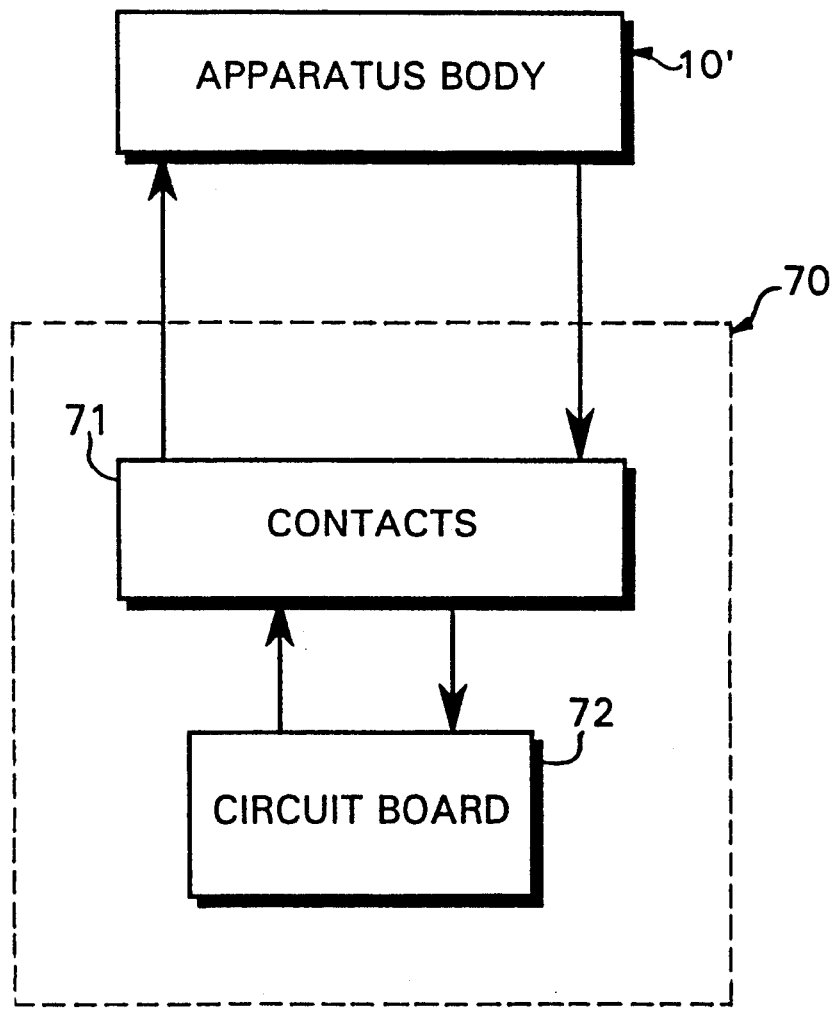

IC CARD ADAPTER FOR USE IN MEMORY CARD SLOT WITH OR WITHOUT SUPERIMPOSED MEMORY CARD

This is a continuation of application Ser. No. 07/425,102, filed Oct. 23, 1989, now abandoned.

BACKGROUND OF THE INVENTION

1. Field of the invention

The present invention relates to an electronic apparatus such as an electronic organizer, a pocket computer, a personal computer, a programmable measuring instrument or the like, and to an adapter for the electronic apparatus. More particularly, the invention relates to an electronic apparatus which is provided with various functions by a device such as a memory card (a card containing either ROM or RAM, or both) detachably mounted in the apparatus body, and to an adapter for the electronic apparatus.

2. Description of the prior art

Electronic apparatuses such as electronic organizers are provided with various functions by a memory card containing a memory such as a ROM or the like, mounted in the apparatus body. Interfaces which may be used for the connection of the memory card to the electronic apparatus include multiple-pin contact connections, 8-pin contact connections, non-contact electromagnetic induction connections, non-contact radio wave connections, and various others. Since these interfaces are not compatible with each other, a device having, for example, a non-contact electromagnetic induction interface cannot be directly connected for use with an apparatus having an ordinarily used contact interface. Therefore, data transmission between an apparatus with a contact interface and a memory card with a non-contact interface is usually achieved using a reader-writer, which means that the apparatus is required to be equipped with an interface for special use with the reader-writer in addition to the interface for the memory card. Hence, the problem arises that the apparatus body will become larger in size to house the extra interface.

Generally, a memory card uses a multiple-pin contact interface with 30 to 50 pins, and the thickness of the memory card is 2 to 5 mm. Apart from such memory cards, in recent years IC cards have been coming into wide use which contain a CPU and can be written to. The IC card uses either an 8-pin contact interface or a non-contact interface, and the thickness is approximately 0.76 mm. The IC card is usually used with an ATM (Automatic Teller Machine) or the like. Since the IC card thus has a thinner construction than the memory card for special use with a given electronic apparatus, and since the IC card uses an interface of different type from that of the memory card, the IC card cannot be used with the electronic apparatus by inserting it into the memory card slot of the apparatus body. To use the IC card as well as the memory card, an electronic apparatus is required, as shown in FIG. 13, to be equipped with a memory card slot 92 for mounting the memory card and an IC card slot 93 for mounting the IC card in its body 90. Hence, the problem arises that the apparatus body 90 will become larger in size. If the construction is so made that the memory card slot 92 and the IC card slot 93 are disposed one on the top of the other, it is possible to reduce the size of the apparatus body 90 to some extent, but in the case of a portable electronic apparatus such as an electronic organizer with which the memory card is usually used, the size may still be too bulky for the portable purpose for which such apparatus is designed.

SUMMARY OF THE INVENTION

The electronic apparatus of this invention, which overcomes the above-discussed and numerous other disadvantages and deficiencies of the prior art, comprises: a body of said apparatus that has a slot, in which a card-like device detachable from said apparatus body is mounted, and an interface element which allows data transmission between said apparatus body and said device when said device is mounted in said slot; and a holding member that is provided on said for holding in a superimposed manner thereon a different type of card-like device having an interface element, said devices of different types that are held together in a superimposed manner by said holding member being inserted into said slot, and said interface element of said different type of card-like device allowing data transmission between said slot and said different type of device superimposed on said device mounted in said slot.

In a preferred embodiment, the device is a memory card containing a memory.

In a preferred embodiment, the different type of device is an IC card.

The adapter for electronic apparatuses of this invention is to be mounted in a slot of the apparatus body, the apparatus having an interface element which allows data transmission between the apparatus and a card-like device detachable from the apparatus body when the device is mounted in a slot of the apparatus body, wherein said adapter comprises:

an interface element for the apparatus, which allows data transmission between said adapter and said apparatus body when said adapter is mounted in the slot of the apparatus body;

a slot for a different type of device in which a different type of card-like device is mounted;

an interface element for the different type of device, which allows data transmission between said adapter and said different type of device when said different type of device is mounted in the slot for the different type of device; and a circuit block which provides electrical connections between said interface element for the different type of device and said interface element for the apparatus.

In a preferred embodiment, the adapter further comprises an identification signal generator that sends a prescribed signal to said apparatus body indicating that said adapter, not the device, has been mounted when said adapter is mounted in said apparatus body.

In a preferred embodiment, the adapter further comprises a operation part for reading data contained in the different type of device mounted in the slot for the different type of device and/or writing data to the different type of device, a display part for displaying the data that is read out and/or to be written to, and a power supply for the operation and display parts.

In a preferred embodiment, the different kind of device is an IC card.

In a preferred embodiment, the interface element for the different type of device is a non-contact electromagnetic induction type.

In a preferred embodiment, the slot for the different type of device houses the entire part of the IC card mounted therein.

In a preferred embodiment, the slot for the different type of device has a pair of belt-like holders to hold the IC card, the IC card held therein being exposed to the outside of the adapter.

Thus, the invention described herein makes possible the objectives of (1) providing an electronic apparatus in which a device and a different type of device different from the type of the device that can be mounted in the apparatus body in a superimposed manner, without increasing the size of the apparatus body, whereby even when the electronic apparatus has prescribed functions by the use of a memory card, an IC card is mounted in the apparatus body, thereby attaining operation for writing data thereto and reading stored data therefrom; (2) providing an adapter for the electronic apparatus that allows data transmission between the apparatus body and a different type of device different from that of the device mounted in the apparatus body, without increasing the size of the apparatus body; (3) providing an adapter for electronic apparatus that generates a signal indicating that the adapter, not the device, has been mounted when the adapter is mounted in the apparatus body, thereby protecting the device mounted therein from adverse effects caused from misidentification or misoperation of the device; and (4) providing an adapter for mounting an IC card that is provided with an operation part for reading stored data from or writing data to the IC card, a display part for displaying the said data, and a power supply, which makes it possible to read from and write to the IC card without mounting the adapter in the electronic apparatus.

BRIEF DESCRIPTION OF THE DRAWINGS

This invention may be better understood and its numerous objects and advantages will become apparent to those skilled in the art by reference to the accompanying drawings as follows:

FIGS. 6 and 7, respectively, are a cross sectional view and a block diagram showing memory card device of the electronic apparatus of the present invention.

DESCRIPTION OF THE PREFERRED EMBODIMENTS

Example 1

Figure 1:
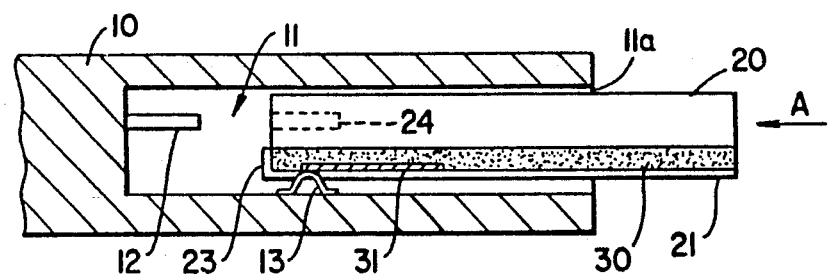
FIG. 1 is a cross sectional view showing a main part of an electronic apparatus of the present invention.

The electronic apparatus of the present invention comprises, as shown in FIG. 1, an apparatus body 10 such as a terminal, a memory card 20 of a thickness of 2 to 5 mm to be mounted in the apparatus body 10, and an IC card 30 of a thickness of approximately 0.76 mm containing a CPU. The memory card 20 contains the memory. The apparatus body 10 is provided with a slot 11 into which the memory card 20 and the IC card 30, one superimposed on the other, are inserted. Therefore, an opening 11a of the slot 11 has a cross sectional area slightly larger than the combined cross sectional area of the memory card 20 and IC card 30, one superimposed on the other. Provided on the innermost part of the slot 11 are numerous pins 12 constituting a connector which serves as an interface for data transmission between the apparatus body 10 and the memory card 20. On one end of the memory card 20 parallel to the width thereof, there are provided female contacts 24, arrayed in the widthwise direction of the memory card 20, into which the pins 12 provided on the innermost part of the slot 11 of the apparatus body 10 are inserted, the female contacts 24 constituting a connector which serves as an interface for data transmission to and from the apparatus body 10. Also, on the bottom surface of the slot 11, there is provided a contact member 13 protruding in an upwardly curved shape to constitute a connector which serves as an interface with the apparatus body 10 by pressing against a contact portion 31 formed on the IC card 30.

Figure 2:
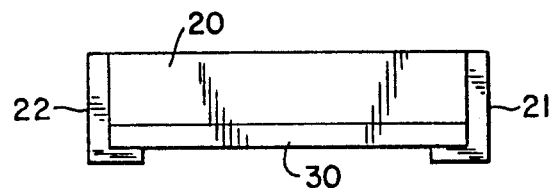
FIG. 2 is a side view showing a memory card and an IC card that are held together in a superimposed manner in the electronic apparatus of FIG. 1.
Figure 2A:
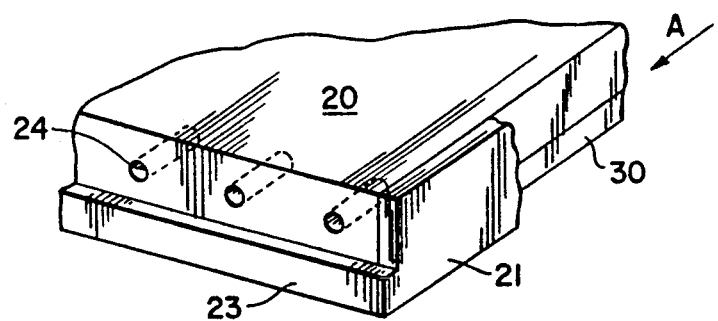
FIG. 2a is a perspective view of one corner of the adapter of FIGS. 1 and 2 better illustrating the IC card holder with sides 21, 22 and end stop 23.

As shown in FIG. 2 and FIG. 2a, the memory card 20 is provided with holding members 21 and 22, each having an L-shaped cross section, on the respective sides along the longitudinal length thereof. The holding members 21 and 22 extend in one direction (downward) across the thickness of the memory card 20, each extending portion being bent so as to be parallel with the underside of the memory card 20 with a space provided therebetween approximately equal to the thickness of the IC card 30. The IC card 30 is inserted, with its contact portion 31 facing down, into the space between the underside of the memory card 20 and the portions of the holding members 21 and 22 facing that underside. Each of the holding members 21 and 22 is provided with a stopper 23 (FIG. 1) at one end in the longitudinal direction thereof to cover along one end of the memory card 20 the space between the memory card 20 and the holding members 21 and 22. The IC card 30 inserted into the space stops at the stopper 23.

In the electronic apparatus of the above construction, the memory card 20 and the IC card 30, one superimposed on the other, are inserted into the slot 11 of the apparatus body 10. The IC card 30 is inserted, with its contact portion 31 facing down, into the space between the memory card 20 and the holding members 21 and 22 by first positioning the end of the IC card 30 adjacent to its contact portion 31 into that space and then sliding both sides thereof along the holding members 21 and 22. When the end of the IC card 30 stops at the stopper 23, the IC card 30 becomes fixed to the memory card 20 in a superimposed manner.

The memory card 20 and the IC card 30 thus superimposed thereon are inserted, with the side of the contacts 24 of the memory card 20 facing forward as shown in FIG. 1, in the direction shown by arrow A in FIG. 1 through the opening 11a into the slot 11 of the apparatus body 10. When the cards 20 and 30 are mounted in position in the slot 11, the pins 12 provided on the innermost part of the slot 11 are inserted into the female contacts 24 of the memory card 20, thereby electrically connecting the memory card 20 to the apparatus body 10 while the contact portion 31 of the IC card 30 electrically contacts the contact member 13 in the slot 11 to electrically connect the IC card 30 to the apparatus body 10. At this time, with the contacts 24 of the memory card 20 fitted onto the pins 12 in the slot 11, the memory card 20 is prevented from moving in the direction along its thickness, and thus becomes fixed into position, which causes the contact portion 31 of the IC card 30 fixed to the memory card 20 in a superimposed manner to be pressed on the contact member 13 in the slot 11 with a suitable pressure to assure stable electrical connection between the contact portion 31 and the contact member 13.

Figure 3:
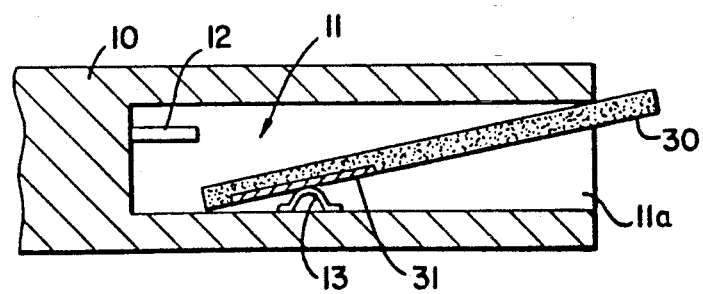
FIG. 3 is a diagram showing the construction of an electronic apparatus of the present invention.

Since the slot 11 is substantially larger than the size of the IC card 30, when the IC card 30 alone is inserted in the slot 11, as shown in FIG. 3, the IC card 30 cannot be firmly held in the slot 11, and therefore, the contact portion 31 of the IC card 30 may not firmly contact the contact member 13 in the slot 11. However, when the IC card 30 is superimposed on the memory card 20 for insertion into the slot 11, there is no such possibility as mentioned above, and the contact portion 31 of the IC card 30 is securely provided with electrical connection to the contact member 13 in the slot 11. Since the IC card 30 is held by the holding members 21 and 22 provided on the memory card 20, no special mechanism is required for fixing and holding the IC card 30 in the slot 11; it is only necessary to make the slot 11 slightly larger than the combined size of the memory card 20 and IC card 30 held together in a superimposed manner. Therefore, the apparatus body 10 requires only one slot 11 slightly larger than the combined size of the superimposed memory card 20 and IC card 30 for electrical connections of the memory card 20 and IC card 30 to the apparatus body 10, and hence no necessity of increasing the size of the apparatus body 10. Since the IC card 30 is detachable from the memory card 20, the memory card 20 alone can be used for insertion into the apparatus body 10, while the IC card can be singly used with an ATM (Automatic Teller Machine) having a special slot for IC cards.

In this embodiment, since the memory card 20 and IC card 30 are inserted in a superimposed manner into the apparatus body 10, it is possible to store in the memory card 20 the operating procedure of the IC card 30. In this case, there is no need to store the operating procedure of the IC card 30 in the apparatus body 10, and therefore, the load on the apparatus body 10 can be reduced. In the case of applying the apparatus body 10 to an electronic organizer or the like, if entry keys are formed on the surface (top) of the memory card 20, for example by printing, while the top surface of the apparatus body 10 is formed of a sheet-like transparent member, then it is possible to operate the entry keys on the memory card 20 through the transparent member of the apparatus body 10 with the memory card 20 mounted in the apparatus body 10.

Furthermore, since each of the holding members 21 and 22 on the memory card 20 is provided with a device for locking the IC card 30 into position, when the memory card 20 with the IC card 30 superimposed thereon is mounted in the slot 11, the IC card 30 is also locked in position together with the memory card 20, therefore, there is no need to provide the slot 11 with a special mechanism to lock the IC card 30.

Example 2

Figure 4:
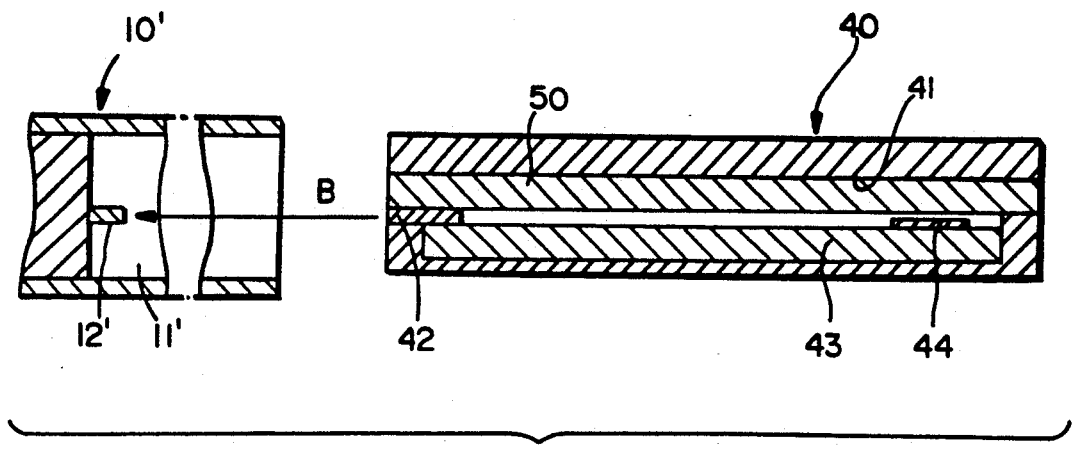
FIGS. 4 and 5, respectively, are a cross sectional view and a plane view showing an adapter together with a part of the body of an electronic apparatus of the present invention.
Figure 5:
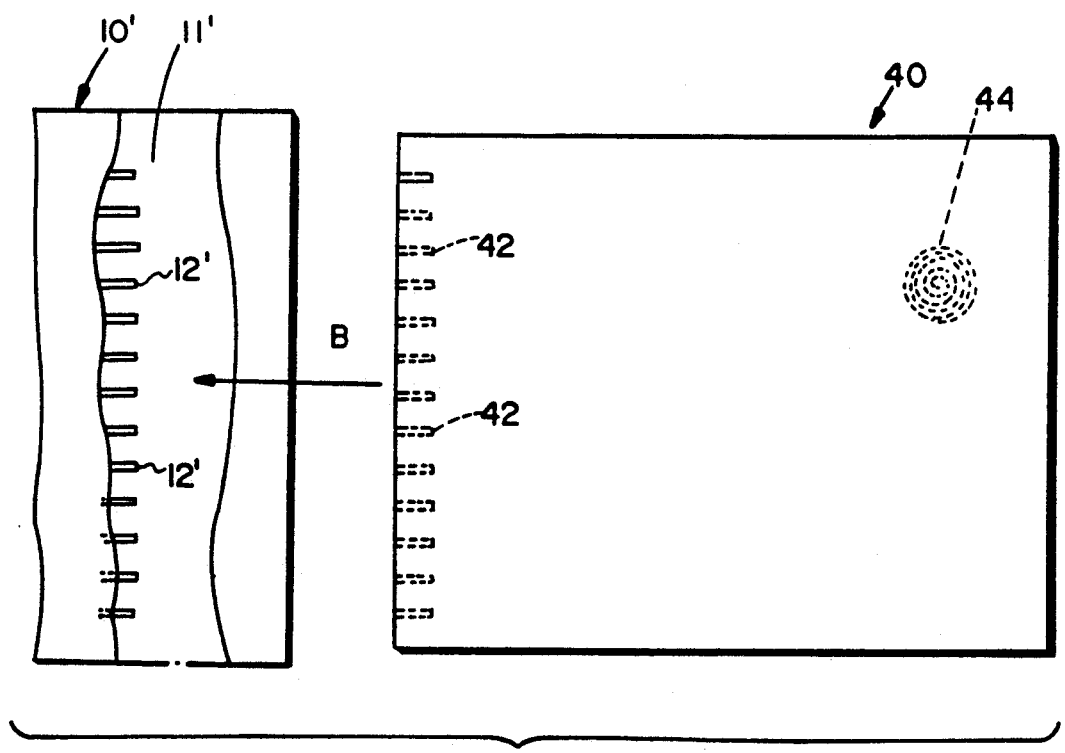
Figure 6:
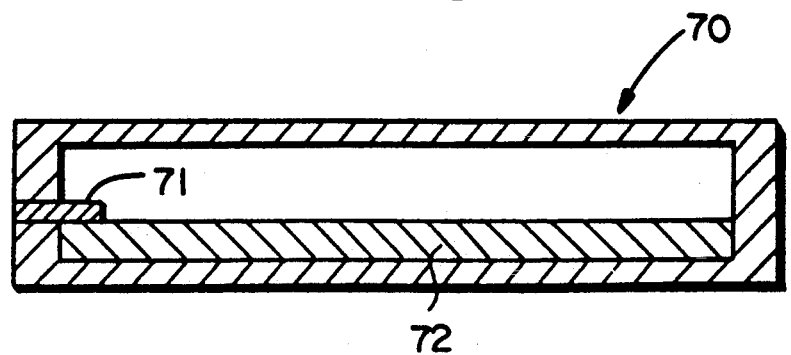

FIGS. 4 and 5 show one example of the adapter for the electronic apparatus according to the present invention. In this embodiment, an adapter 40 for an electronic apparatus is used to electrically connect an IC card 50 having a non-contact electromagnetic induction interface to an apparatus body 10'. The adapter 40 has a shape and size approximately equal to the shape and size of a memory card 70 shown in FIG. 6, the memory card 70 being a device for the apparatus body 10'. The memory card 70 includes female contacts 71 for connection to pins 12' provided in a slot 11' of the apparatus body 10', and a circuit board 72 electrically connected to the contacts 71. As shown in FIG. 7, the contacts 71 of the memory card 70 are connected to the pins 12' provided in the slot 11' of the apparatus body 10', which electrically connects the circuit board 72 of the memory card 70 to the apparatus body 10' for data transmission therebetween. As in the case of the memory card 70, on one end of the adapter 40, there are provided female contacts 42, arrayed along the width thereof, for connection to the pins 12' provided in the slot 11' of the apparatus body 10'. In the upper part of the adapter 40, there is provided a hollow slot 41 for holding an IC card. The IC card slot 41 is open at the end where the contacts 42 are provided as well as at the opposite end, and an IC card 50 is inserted into the IC card slot 41 through one open end thereof.

Housed in the lower part of the adapter 40 is a circuit unit 43 consisting of a circuit board, etc., and facing the IC card 50 mounted in the IC card slot 41. The circuit unit 43 is electrically connected to the contacts 42 provided on one end of the adapter 40. The circuit unit 43 is provided with a coil pattern 44 which serves as an interface for data transmission by electromagnetic induction, facing the portion constituting an non-contact electromagnetic induction interface on the IC card 50 mounted in the IC card slot 41.

In the electronic apparatus of the above construction, the adapter 40 is mounted for use in the apparatus body 10' with the IC card 50 inserted in the IC card slot 41 of the adapter 40. When the IC card 50 is mounted in the IC card slot 41 of the adapter 40, the IC card 50 is enabled for data transmission to and from the circuit unit 43 in the adapter 40 by electromagnetic induction via the coil pattern 44.

Thus, with the IC card 50 in an enabled state for data transmission by electromagnetic induction to and from the circuit unit 43 in the adapter 40, the adapter 40 is held with its end on which the contacts 42 are provided facing forward, and pushed in the direction shown by arrow B in FIGS. 4 and 5 for mounting into the slot 11' of the apparatus body 10'. When the adapter 40 is mounted in the slot 11', the pins 12' provided in the slot 11' of the apparatus body 10' are inserted into the contacts 42 of the adapter 40 for electrical connections therebetween. As a result, the circuit unit 43 in the adapter 40 enabled for data transmission to and from the IC card 50 by electromagnetic induction is electrically connected to the apparatus body 10', thereby enabling data transmission between the apparatus body 10' and the IC card 50 mounted in the adapter 40.

Example 3

Figure 8:
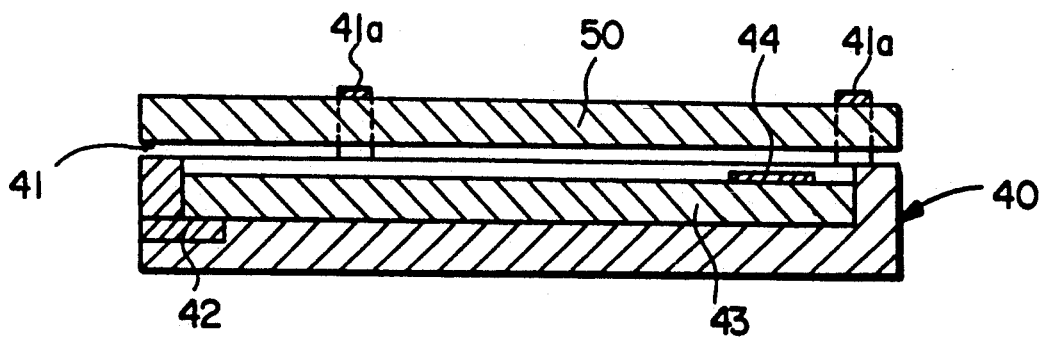
FIGS. 8, 9 and 10, respectively, are a cross sectional view, a plane view, and a block diagram showing another adapter of the present invention.
Figure 9:
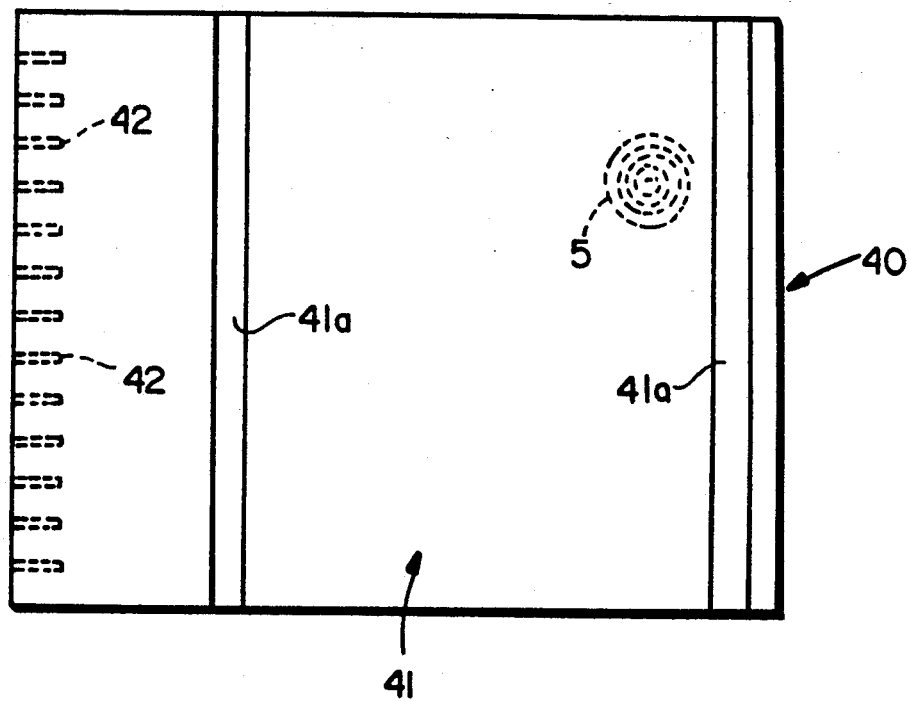

An adapter 40 of this embodiment, as can be seen in FIGS. 8 and 9, differs from the adapter of Example 2 only in the construction of the IC card slot 41. The IC card slot 41 of the adapter 40 is provided with a pair of belt-like card holders 41a for holding an IC card 50 to be inserted, and the portions thereof other than the card holders 41a are open. The construction of the other portions of the adapter 40 is the same as that of Example 2.

Since the adapter 40 of this embodiment is so constructed as to hold the IC card 50 using the belt-like card holders 41a in the IC card slot 41 which is open, the IC card 50 held in position is exposed to the outside of the adapter 40, thereby making it possible to make the entire thickness of the adapter 40 thinner.

Example 4

Figure 10:
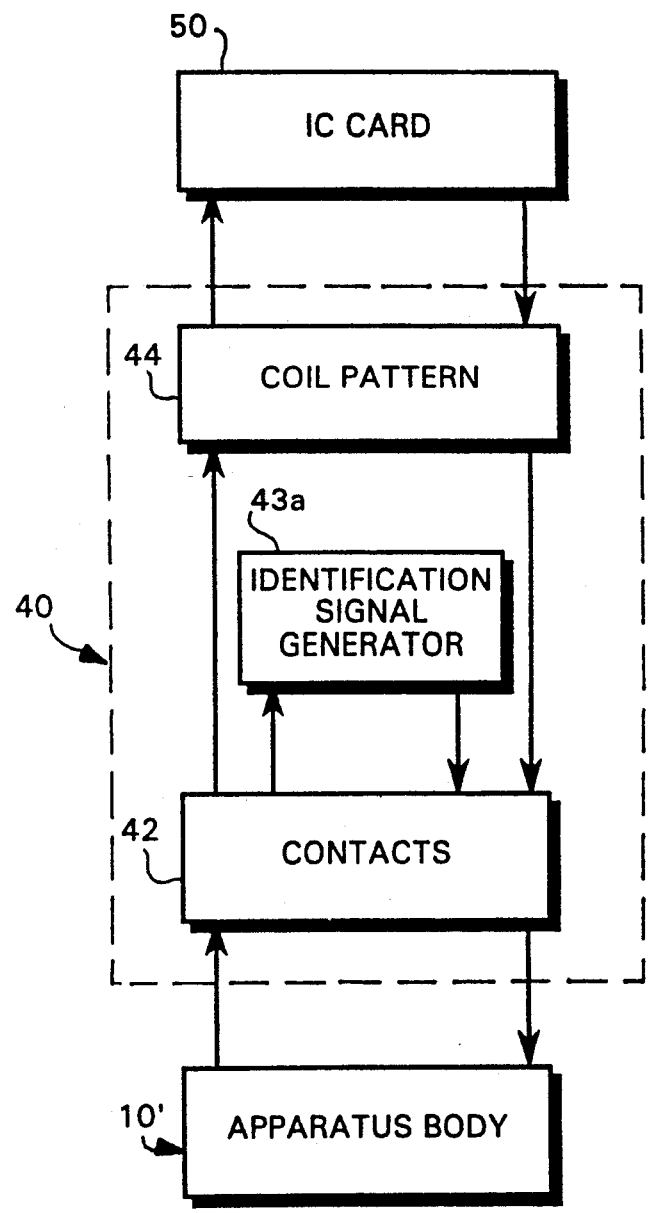

In this embodiment, as shown in FIG. 10, an identification signal generator 43a is provided in the circuit unit 43 of the adapter 40 of Example 2. When the adapter 40 is mounted in the slot 11' of the apparatus body 10' with the contacts 42 of the adapter 40 electrically connected to the pins 12' of the slot 11', current is fed from the apparatus body 10' to the identification signal generator 43a provided in the circuit unit 43 of the adapter 40, causing the identification signal generator 43a to send a prescribed signal to the apparatus body 10' indicating that the adapter 40, not the memory card 70, has been mounted. With this signal, the apparatus body 10' automatically selects a suitable access program for the IC card 50 mounted in the adapter 40. This prevents misidentification and misoperation of the IC card 50 enabled for data transmission to and from the apparatus body 10', thereby protecting the IC card 50 from adverse effects. The type of signal to be generated by the identification signal generator 43a is not limited to the signal just indicating the mounting of the adapter 40 which is different from the exclusive-use device, but to a signal that can be generated according to the IC card 50 mounted in the adapter 40.

Example 5

Figure 11:
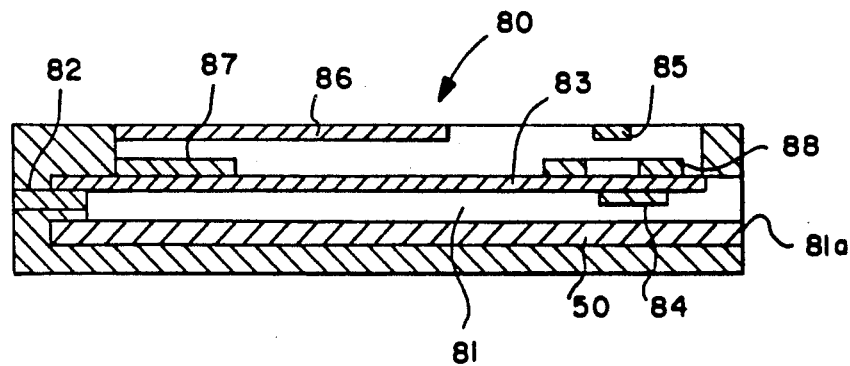
FIG. 11 is a cross sectional view showing another adapter of the present invention.
Figure 12:
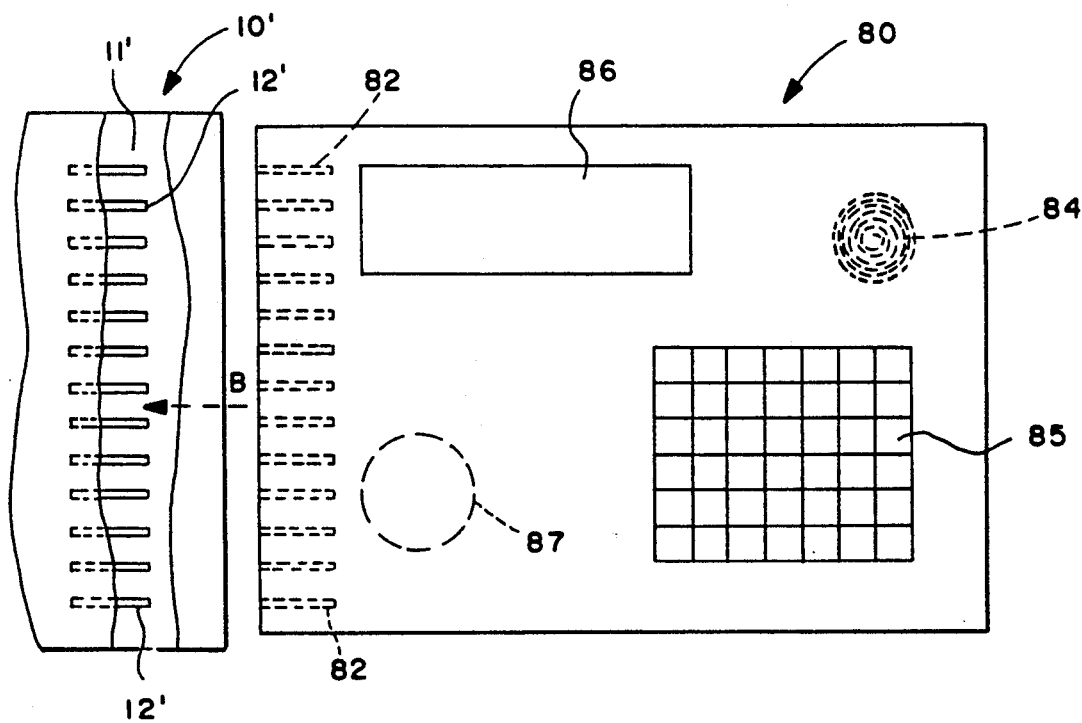
FIG. 12 is a plane view showing the adapter of FIG. 11 together with a part of the body of an electronic apparatus of the present invention.
Figure 13:
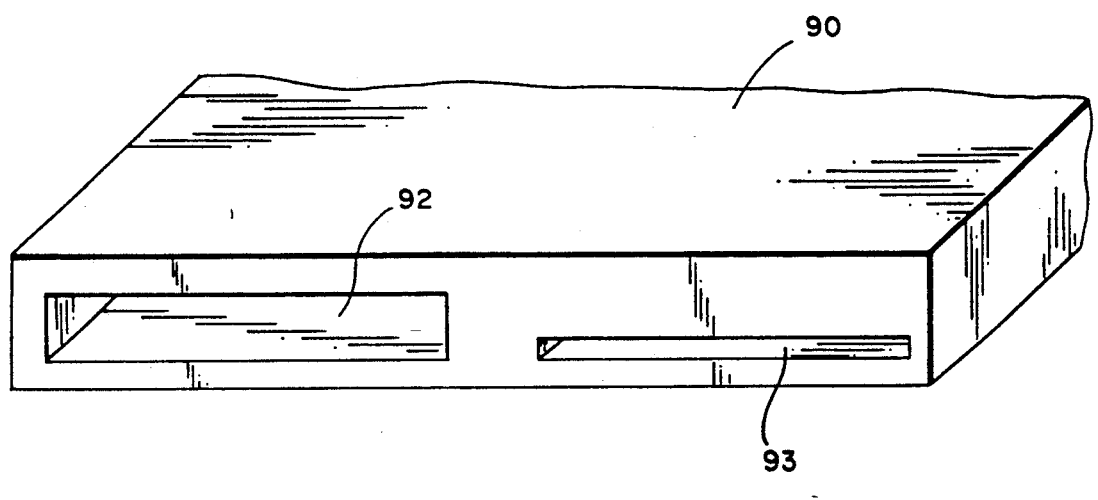
FIG. 13 is a perspective view showing a main part of a conventional electronic apparatus.

FIGS. 11 and 12 illustrate yet a further embodiment of the adapter for the electronic apparatus according to the present invention. In this embodiment, an adapter 80 for connecting the IC card 50 having a non-contact electromagnetic induction interface to the apparatus body 10' for data transmission has a card-like construction of a shape and size approximately equal to the shape and size of the aforementioned memory card 70, and is inserted for use into the slot 11' of the apparatus body 10'. On one end of the adapter 80, there are provided female contacts 82, arrayed along the width thereof, into which the pins 12' provided on the innermost part of the slot 11' of the apparatus body 10' are inserted. In one side of the adapter 80 viewed across the thickness thereof is provided an IC card slot 81. The IC card slot 81 has an opening 81a at its end opposite from the end on which the contacts 82 are provided, and the IC card 50 is inserted through the opening 81a into the card slot 81, the entire part of the IC card 50 being housed in the card slot 81.

In the adapter 80, a circuit unit 83 is disposed in parallel with the IC card 50 mounted in the card slot 81 and with suitable spacing provided therebetween. The circuit unit 83 consists of a circuit board, etc., and is electrically connected to the contacts 82 provided on one end of the adapter 80. The circuit unit 83 is provided with a coil pattern 84 which serves as an interface for data transmission by electromagnetic induction, facing the portion constituting a non-contact electromagnetic induction interface on the IC card 50 mounted in the IC card slot 81.

On the upper surface of the adapter 80, there is provided a keyboard 85 for reading data stored in the IC card 50 mounted in the card slot 81 and writing data to the IC card 50, and a display part 86 for displaying data read from the IC card 50 or to be written thereto by the keyboard 85.

Disposed on the circuit unit 83 is a power supply 87 such as a battery for feeding current to the key operation part 85 and the display part 86. Also disposed thereon is a key spacer 88 for operating a specified contact on the circuit unit 83 according to the key operated on the keyboard 85.

In the electronic apparatus of the above construction, the adapter 80 is mounted for use in the apparatus body 10' with the IC card 50 mounted in the card slot 81 of the adapter 80. When the IC card 50 is mounted in the card slot 81 of the adapter 80, the IC card 50 is enabled for data transmission to and from the circuit unit 83 in the adapter 80 via the coil pattern 84.

The adapter 80 with the IC card 50 thus electrically connected and mounted is held with its end on which the contacts 82 are provided facing forward, and pushed in the direction shown by arrow B in FIG. 12 for mounting into the slot 11' of the apparatus body 10'. When the adapter 80 is mounted in position in the slot 11', the pins 12' in the slot 11' of the apparatus body 10' are inserted into the contacts 82 of the adapter 80 for electrical connection therebetween. As a result, the circuit unit 83 in the adapter 80 becomes electrically connected to the apparatus body 10', thus the IC card 50 mounted in the adapter 80 being electrically connected to the apparatus body 10' for data transmission between them.

For just reading data from the IC card 50 or writing data thereto, since the key operation part 85 can be operated, with the IC card 50 mounted in the card slot 81 of the adapter 80, to have the data read out or to be written displayed on the display part 86 on the upper surface of the adapter 80, it is not necessary to mount the IC card 50 in the apparatus body 10'.

In this embodiment also, if the upper surface of the apparatus body 10' is formed of a flexible transparent member, it is possible to operate through the transparent member the keyboard on the adapter 80 mounted in the apparatus body 10'.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An adapter for an electronic apparatus, the electronic apparatus comprising a plurality of pins which are connected to female contacts of a memory card device when said emory card device is inserted into a slot of said electronic apparatus to allow data transmission between said memory card device and said electronic apparatus, said adapter being sized to be inserted into said slot, wherein said adapter comprises:

female contacts which are connected to said plurality of pins in said slot when said adapter is inserted into said slot;

a slot for inserting an IC card device, said IC card being substantially thinner than said memory card device;

an interface element for said IC card device which allows data transmission between said adapter and said IC card device; and a circuit which provides electrical connections between said IC interface element and said female contacts for said adapter.

2. An adapter according to claim 1, which further comprises an identification signal generator that sends a prescribed signal to said apparatus indicating that said adapter, not the memory card device, has been mounted when said adapter is mounted in said apparatus body.

3. An adapter according to claim 1, which further comprises a keyboard for reading data contained in the IC card device when inserted into the slot for the adapter or for writing data to the IC card device, a display for displaying the data that is read out or written to the IC card device, and a power supply for powering the keyboard and display.

4. An adapter according to claim 1, wherein said interface element for the IC card device is a non-contact electromagnetic induction type.

5. An adapter for facilitating space-efficient interface with an electronic apparatus having first and second electrical signal interfaces disposed within an end and a side of a slot at one end of a narrow rectangular cavity, said adapter comprising:

a memory card of a first thickness with an electrical signal interface including female plug contact sockets at one end thereof, an IC card of a second thickness less than said first thickness and with an electrical signal interface including conductive surface areas on one side thereof, holding means for releasably superimposing and retaining said cards stacked together as a composite unit with their respective electrical signal interfaces exposed at an end and side respectively of the holding means to mate and respectively exchange signals with said first and second electrical signal interfaces of the electronic apparatus when the composite unit is inserted into said slot.

6. An adapter as in claim 5 wherein said holding means includes a housing having an opening for receiving said IC card and structured to fit within said slot and interface an included memory card with said electronic apparatus even if the IC card is not present.

7. An adapter for facilitating space-efficient interface with an electronic apparatus having an electrical signal interface disposed within a slot at one end of a narrow rectangular cavity, said adapter comprising:

a housing having an electrical signal interface having female plug contact sockets at one end which matingly connects with electrical signal interface male contacts of the electronic apparatus when the adapter is inserted into said slot;

said housing including a memory card permanently connected to the female plug contact socket electrical signal interface of the housing;

said housing including an opening for receiving an IC card therewithin; and said housing including a coupling circuit for coupling signals between the electrical signal interface of the housing and said IC card when one is present therein, wherein the IC card faces the memory card when the IC card is present in the housing.

8. An adapter for facilitating space-efficient interface with an electronic apparatus having an electrical signal interface disposed within a slot at one end of a narrow rectangular cavity, said adapter comprising:

a housing having an electrical signal interface with female plug contact sockets at one end which matingly connects with electrical signal interface male contacts of the electronic apparatus when the adapter is inserted into said slot;

said housing including an opening for receiving an IC card therewithin which matingly connects with the electrical signal interface male contacts of the electronic apparatus when the adapter is inserted into said slot;

said housing including a circuit board overlying said opening and electrically coupled to the electrical signal interface of the housing;

said circuit board including an electrical signal interface for coupling signals to and from an IC card when one is present in the opening; and said circuit board including a keyboard, display and power supply for powering same.

9. An electronic apparatus comprising:

a memory card device having female contacts; and a body having a slot for receiving said memory card device, said body having a plurality of pins in said slot which are connected to said female contacts of said memory card device and allow data transmission between said body and said memory card device when said memory card device is inserted into said slot, said memory card device having a holding member for holding, in a superimposed manner, an IC card device which is substantially thinner than said memory card device and has a contact portion, said slot, into which said memory card device with said IC card device superimposed thereon is capable of being inserted, having a contact member contacting said contact portion of said IC card device to allow data transmission between said body and said IC card device.

10. An adapter for an electronic apparatus, the electronic apparatus comprising a plurality of pins which are connected to female contacts of a memory card device when said memory card device is inserted into a slot of said electronic apparatus to allow data transmission between said memory card device and said electronic apparatus, said adapter being sized to be inserted into said slot, wherein said adapter comprises:

female contacts which are connected to said plurality of pins in said slot when said adapter is inserted into said slot;

a slot for inserting an IC card device, said IC card being substantially thinner than said memory card device;

an interface element for said IC card device which allows data transmission between said adapter and said IC card device; and a circuit which provides electrical connections between said IC interface element and said female contacts for said adapter, wherein said slot for the IC card device has a pair of belt-like holders extending continuously from one end connected to the adapter to an opposite end also connected to the adapter and holding the IC card, the IC card held therein being exposed to the outside of the adapter except where covered by said belt-like holders.

11. A terminal adapter for facilitating space-efficient interface with a portable electronic apparatus having an electrical signal interface disposed within a slot at one end of a narrow rectangular cavity, said adapter comprising:

a housing having an electrical signal interface having female plug contact sockets at one end which matingly connects with electrical signal interface male contacts of the electronic apparatus when the adapter is inserted into said slot;

said housing including a memory card permanently connected to the female plug contact socket electrical signal interface of the housing;

said housing including an opening for receiving an IC card therewithin, the IC card being substantially thinner than the memory card; and said housing including a coupling circuit for coupling signals between the electrical signal interface of the housing and said IC card when one is present therein, wherein the IC card faces the memory card when the IC card is present in the housing.

* * * * *